United States Patent [19]

Hayden

[11] Patent Number: 5,464,605
[45] Date of Patent: Nov. 7, 1995

[54] PROCESS FOR THE DECOMPOSITION AND REMOVAL OF PEROXIDES

[75] Inventor: Richard A. Hayden, Pittsburgh, Pa.

[73] Assignee: Calgon Carbon Corporation, Pittsburgh, Pa.

[21] Appl. No.: 194,826

[22] Filed: Feb. 14, 1994

Related U.S. Application Data

[63] Continuation-in-part of Ser. No. 7,169, Jan. 21, 1993.
[51] Int. Cl.$^6$ .......................... C01B 13/00; B01J 21/18; B01J 20/20
[52] U.S. Cl. .......................... 423/579; 502/180; 502/416; 502/417; 502/434
[58] Field of Search .................................... 502/180, 174, 502/410, 429, 434

[56] References Cited

U.S. PATENT DOCUMENTS 5,173,466  12/1992  Hains et al. ............................ 502/182
5,356,849  10/1994  Matuiya et al. ........................ 502/180

OTHER PUBLICATIONS

The Catalytic Activity of Activated Nitrogenous Carbons Paul F. Bente & Jame H. Walton–J. Phys. Chem, 47, 133 (1943).

Primary Examiner—Asok Pal
Assistant Examiner—Patrick J. Neill
Attorney, Agent, or Firm—Titus & McConomy

[57] ABSTRACT

A process is provided for the removal of peroxides from gaseous or liquid media. The improvement is provided by the use of a carbonaceous char active for peroxide decomposition which is prepared by the carbonization and oxidation of a bituminous coal or bituminous coal-like material at temperatures below 700° C. followed by exposure of the carbonized, oxidized char to a nitrogen-containing compound during the initial calcination and condensation of the carbon structure as the temperature is raised to above 700° C.

3 Claims, 1 Drawing Sheet

PROCESS FOR THE DECOMPOSITION AND REMOVAL OF PEROXIDES

This is a continuation-in-part of copending application Ser. No. 08/007,169 filed on Jan. 21, 1993.

FIELD OF THE INVENTION

The present invention relates to a process for the decomposition and removal of peroxides from liquid or gaseous media.

BACKGROUND OF THE INVENTION

It is well known that peroxide compounds, such as hydrogen peroxide, can occur as unwanted constituents in a number of process or wastewater streams. Hydrogen peroxide, for example, is toxic to certain sensitive ecosystem components such as Daphnia at concentrations of a few parts per-million. The presence of peroxide in certain process streams may cause unwanted degradation of key system components or materials of construction. Thus, the removal of such peroxide compounds may not only be desirable, but also necessary.

Past practices for the removal of peroxides have relied either on direct chemical reduction or the use of materials, such as activated carbon, which are capable of catalyzing the direct autoxidation-reduction of the peroxide moiety. The practice of using direct chemical reduction is often expensive and inconvenient, and usually requires continuous chemical addition and continuous monitoring of chemical dose rates as a function of peroxide concentration. The use of activated carbon, however, is inherently more convenient since it requires no chemical additions. For this reason it is preferred when it can be made economically viable.

It has been known that certain activated carbons have the ability to catalyze peroxide decomposition and removal, the extent to which such carbons can effect peroxide removal has not been sufficient to allow their widespread use per se in such applications. In fact, some carbons are so inactive towards peroxides that they can be used to purify the peroxide streams without significant peroxide decomposition. To obtain satisfactory commercial performance in peroxide removal applications it has usually been necessary to impregnate activated carbons with metals such as platinum or palladium. Such metals are highly active for peroxide decomposition. Other carbon post-treatments, such as exposure to nitrogen-containing compounds at high temperatures, have in some cases also resulted in improvements in carbon performance. However, each of these methods has certain disadvantages which have limited their widespread commercial acceptability.

Where activated carbons have been impregnated to improve their peroxide removal capabilities, several inherent disadvantages limit their overall utility. These disadvantages include the high costs of the impregnants, low carbon ignition temperatures, impregnant toxicity and attendant disposal limitations, and the tendency of many impregnants to leach into, dissolve into, or otherwise contaminate liquid effluent process streams.

Where activated carbons have been post-treated at high temperatures with nitrogen-containing compounds to improve activity, the processes required to produce enhanced activity have been inherently expensive and hazardous, yielding products of variable quality and marginal economic utility. Typically, such processes are expensive because they employ a nitrogen-rich synthetic compound or a finished high-temperature char, such as an activated carbon, as the primary feedstock, or require large quantities of reagents, large carbon losses, and significant departures from standard activated carbon production practices to effect significant gains in the peroxide reactivity of the final product. Additionally, such processes are hazardous because they usually employ hazardous reagents, such as ammonia or nitric acid, and generate significant amounts of toxic byproducts, such as cyanide or nitrogen oxides, during processing.

Accordingly, it is the object of the present invention to provide a process for peroxide decomposition and removal which is at once economical, convenient, effective, and environmentally benign. It is further the object of the present invention to employ a carbon for this process which is made directly from an inexpensive and abundant nitrogen-poor starting material such as a bituminous coal or a bituminous coal-like material, and to limit the use of agents responsible for imparting peroxide reactivity to the starting material by performing the essential treatment steps during the low-temperature transition of the starting material into the final product. It is yet a further object of the invention to provide carbon treatment steps which include the use of low-temperature carbonization and oxidation of the starting material, by inexpensive, abundant, and relatively non-toxic oxidants, and exposure of the oxidized, low-temperature char to small amounts of inexpensive, abundant and relatively non-toxic nitrogen-containing compounds during, rather than after, the initial calcination and condensation of the carbon structure. Such treatments are highly compatible with current processes for manufacturing activated carbons, and can be carried out with minimal departures from conventional practice.

SUMMARY OF THE INVENTION

Generally, the present invention comprises a process for the removal of peroxides from liquid or gaseous media by contacting the media with a catalytically-active carbonaceous char. Such chars are prepared by the low-temperature carbonization and extensive oxidation of a naturally-occurring, nitrogen-poor carbon feedstock. The low-temperature carbonaceous char is one which has not experienced temperatures greater than 700° C. The char is then subjected to a nitrogen-containing compound during the initial calcination or calcination/activation of the low-temperature char. In all other known methods for the preparation of nitrogen-treated carbons for peroxide decomposition, either high-value synthetic organic compounds or finished high-temperature carbonaceous chars such as charcoal or activated carbon are used as starting materials. In the latter case, extensive post-treatments of the starting material are required. In all cases, high-temperature carbonaceous chars are those produced by thermal treatment at temperatures greater than 700° C.

Accordingly, the sequence of treatment steps in the present invention is important in that subjection of the low-temperature oxidized char to nitrogen-containing compounds during, rather than after its transformation into a high-temperature char, but after, not before, its low-temperature carbonization and oxidation, permits minimal use of such compounds. Safety, environmental, and economic costs are thereby greatly minimized. At the same time, the development of the char's peroxide destruction capability and the compatibility of the process with current processes for the manufacture of high-temperature chars from such starting materials are optimized. Post-treatment processes are entirely eliminated since the desired material is produced directly.

The preferred nitrogen-poor carbon feedstock is a bituminous coal or a bituminous coal-like material (i.e., one having bituminous characteristics or properties) such as those derived from higher or lower rank bitumens, coals, or lignocellulose materials by various chemical treatments. Examples of higher rank coals include anthracite or semi-anthracite coals, while examples of lower rank coals include peat, lignite, and sub-bituminous coals. Examples of the chemical treatment of these feedstocks include alkali metal treatment of the high rank materials and zinc chloride or phosphoric acid treatment of the low rank materials. These types of treatments can also be applied to lignocellulose materials.

In a preferred embodiment of this invention, the feedstock material is pulverized, mixed if necessary with small amounts of a suitable binder such as pitch, briquetted or otherwise formed, and sized. The sized material is then extensively oxidized at temperatures less than 700° C., preferably less than 400° C. The oxidation is continued until additional gains in the catalytic activity of the final product are no longer evident. The oxidation is well beyond that typically required to remove the coking properties of bituminous coals and produces an optimally oxidized char. Other convenient means of oxidation can also be used to effect the low-temperature oxidation and carbonization of the starting material.

The oxidized low-temperature carbonaceous char is then exposed to small amounts of an inexpensive, abundant, and relatively non-toxic nitrogen-containing compound such as urea, urea like materials, melamine, amines or derivatives thereof containing nitrogen, where the nitrogen exhibits a formal oxidation number less than that of elemental nitrogen, during, not after, the initial calcination and condensation of the carbon structure. The amounts of nitrogen-containing compounds used are typically small, preferably less than 5% by weight of the oxidized low-temperature carbonaceous char or such that additional gains in the catalytic activity of the final product are no longer evident. The treatment is carried out by heating the oxidized low-temperature char to high temperatures, preferably between 850° C. and 950° C., in the presence of the nitrogen-containing compound. This heating is preferably conducted under an atmosphere that is inert except for the gases and vapors attributable to the char and/or the nitrogen-containing compound. The heating rates and temperatures are preferably selected such that additional gains in the catalytic activity of the final product are no longer evident.

The nitrogen-treated high-temperature carbonaceous char may then be activated to the desired density at temperatures above 700° C. in steam and/or carbon dioxide, with or without the addition of other gasifying agents such as air. The calcined or calcined/activated carbonaceous char is then cooled in an oxygen-free or otherwise inert atmosphere to temperatures less than 400° C., preferably less than 200° C. Additional gains in catalytic activity may be realized by repeating oxidation/exposure to nitrogen-containing compounds/calcination or calcination/activation/inert cooling as many times as may be desired. Alternatively, any other method known to generate catalytic activity in high temperature carbonaceous chars may be applied to the resultant product to further enhance its catalytic activity.

The carbonaceous char prepared according to the above method is then contacted with gaseous or liquid media which contain the peroxide compounds of interest. The peroxides are decomposed and removed from the media upon contact with the char. Other advantages of the invention will become apparent from a perusal of the following detailed description of the invention taken in connection with the accompanying drawings.

PRESENTLY PREFERRED EMBODIMENTS

Figure 1:
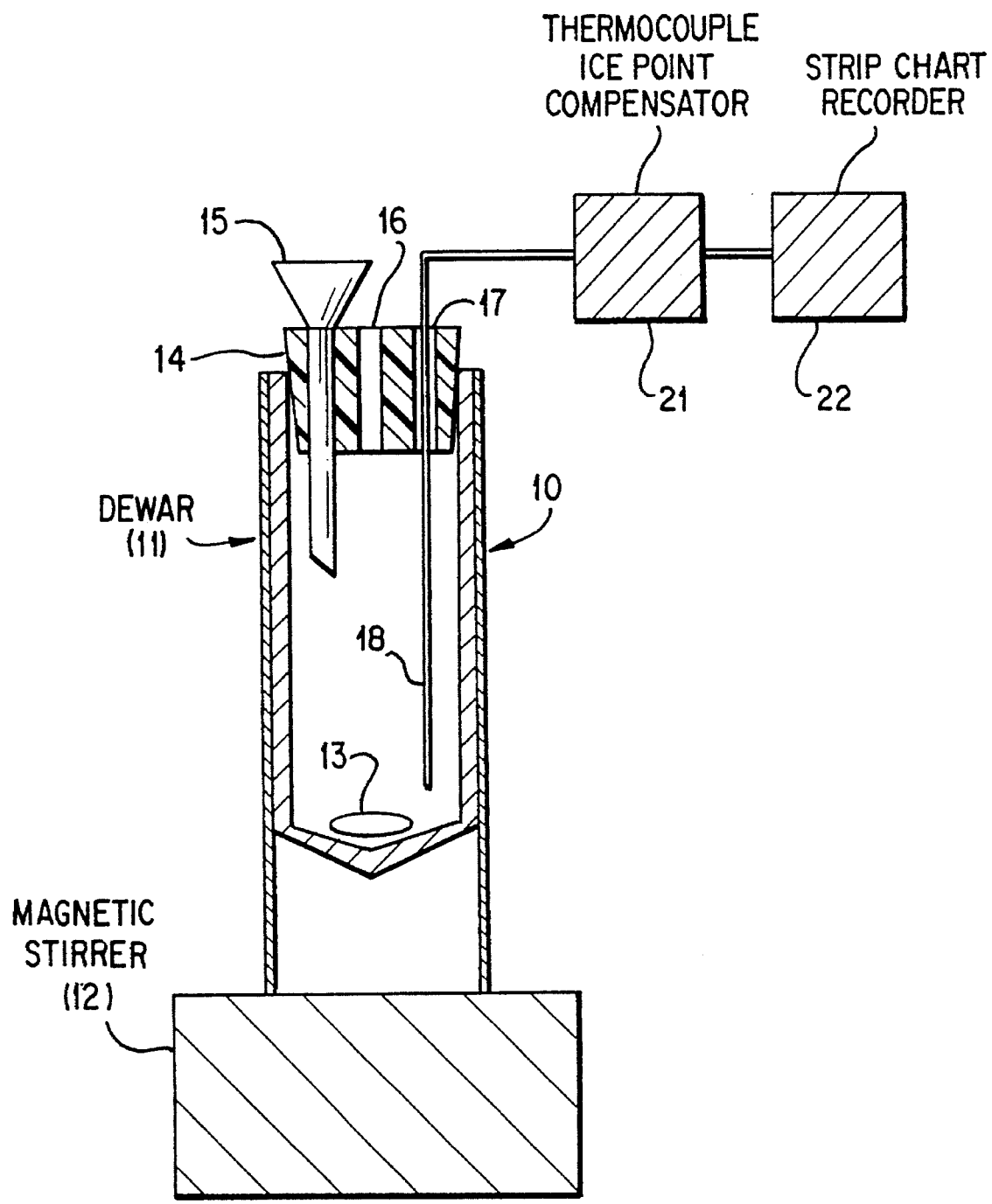
FIG. 1 is a diagrammatic view of a representative apparatus for measuring the degree to which carbonaceous chars prepared according to the present invention can decompose peroxides.

The following examples illustrate the practice of the invention as well as the importance of extensive oxidation and treatment with a nitrogen-containing compound in the practice of the invention. Example 1 provides a representation of a preferred embodiment of the invention. Comparison of the results of Example 1 to those of Example 2 clearly shows the beneficial effect of extensive oxidation. Likewise, comparison of Example 2 with Example 3 clearly illustrates the importance of the presence of the nitrogen-containing compound during the initial high temperature treatment of the oxidized char. Examples 4–9 provide representations of the practice.

EXAMPLE 1

Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 5 hours, and finally heated from 325° C. to 450° C. at a rate of 125° C. per hour. The resultant oxidized material was cooled to near ambient temperatures in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was contacted with steam, while maintaining a 950° C. temperature, for a period of time sufficient to achieve an Apparent Density (Test Method TM-7, Calgon Carbon Corporation, Pittsbugh, Pa.) of 0.454 grams per cc. After gasification, the material was cooled to ambient temperature under an inert atmosphere.

The ability of the resultant sample to remove peroxide was determined by measuring the elapsed time required for a 0.250 gram portion of this carbonaceous char to decompose a given quantity (0.42 moles) of aqueous hydrogen peroxide. The lower the elapsed time, the greater is the level of peroxide decomposition and removal. The elapsed time is referred to as the t-¾ time. This measurement is accomplished using the test procedure defined in U.S. patent application Ser. No. 08/006,470, filed Jan. 21, 1993 and assigned to the assignee of the present invention which is incorporated by reference herein, and provides the results in terms of t-¾ time. The t-¾ time of the carbon described above, when determined using this procedure, was 4.4 minutes. The t-¾ time was determined in the following manner: With reference to FIG. 1, an apparatus 10 is shown which is useful in conducting the tests of the present invention. Apparatus 10 includes a Dewar 11 (Catalog No. 10-195A, Fisher Scientific Co., Pittsburgh, Pa., or equivalent) positioned on a magnetic stirrer 12 (Model PC-351, Corning Hot Plate Stirrer, Corning Scientific Products, Corning, N.Y., or Model 18425 Nuova II Stir Plate, Thermolyne Corporation, Dubuque, Iowa, or equivalent) and containing therein a magnetic stir bar 13. A beveled, tightly fitting, closed-cell styrofoam cap 14 is positioned in the top of Dewar 11 and includes a funnel 15, a vent 16 and an opening 17 therethrough and into Dewar 11. Through opening 17 is positioned thermocouple 18 which is electrically connected to ice point compensator 21 and strip chart recorder 22.

In practice, the carbonaceous char to be tested is first pulverized such that greater than 90% of the material would pass through a 325 mesh U.S. Standard Series sieve. The styrofoam cap 14 of Dewar 11 is removed and a 0.250 gram portion of this pulverized material is placed therein. Deionized water (100 mL) is then added to the Dewar. The addition of this water is performed in such a manner that any pulverized carbonaceous char clinging to the sides of the Dewar 11 is carried into the main body of the water in the bottom.

Next, a 50 mL aliquot of aqueous buffer solution is added to the Dewar 11. This buffer solution is 0.50 molar in $K_2HPO_4$ and 0.50 molar in $KH_2PO_4$. At this point magnetic stir bar 13 is placed into the Dewar and the magnetic stirrer is energized. Stirring speed is increased until a vortex greater than about ½" deep is formed in the mixture and the optimum stirring speed is achieved. The optimum stirring speed is selected such that additional increases in stirring speed do not significantly affect peroxide decomposition time. Once identified, this optimum stirring speed can be used for all subsequent char samples. If stir bar 13 decouples from the magnetic field before the optimum stirring speed is achieved, it is replaced with a bar which couples more strongly with the magnetic field of the stirrer 12. Optionally, Dewar 11 can be replaced with an equivalent unit that, due to manufacturing variances, positions the stir bar further into the magnetic field of the stirrer 12. If the stir bar still does not adequately couple with the magnetic field of the stirrer 12, the Dewar can be shortened by removing some of the bottom portion of the outside metal casing.

Styrofoam cap 14 is now replaced, and thermocouple 18 (Type K or J, 1/16" diameter, Inconel sheathed, ungrounded or equivalent) is inserted through styrofoam cap 14 and into the mixture such that a measurement representative of the mixture temperature can be obtained, and the thermocouple ice point compensator 21 (Model MCJ-J or MCJ-K, Omega Engineering, Inc., Stamford, Conn., or equivalent) and strip chart recorder 22 are energized.

The strip chart recorder tracing is monitored until the system is seen to come to thermal equilibrium at ambient temperature. Once thermal equilibrium is achieved, 50 mL of an aqueous hydrogen peroxide solution (0.42 moles $H_2O_2$ per 50 mL) is added, as rapidly as possible, to the Dewar 11 through the funnel 15 in the styrofoam cap 14. Care is taken to ensure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. Using the materials and procedures described, this constant temperature is typically about 40° C. greater than ambient temperature. At this point, the styrofoam cap is removed from the Dewar and the action of the stir bar is observed.

If the stir bar is no longer mixing the solution in the desired manner the entire procedure is repeated. If adequate mixing is observed, the elapsed time required for the recorder tracing to reach 75% of its maximum, constant, deflection is determined. This value represents the time required for the char to decompose three-fourths of the available hydrogen peroxide and is referred to as the t-¾ time. This value is reported in units of minutes. Typical values of the t-¾ time for commercial activated carbons are in excess of 30 minutes.

EXAMPLE 2

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 1 hour, and finally heated from 325° C. to 450° C. at a rate of 125° C. per hour. The resultant oxidized material was cooled to near ambient temperatures in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was contacted with steam, while maintaining a 950° C. temperature, for a period of time sufficient to achieve an Apparent Density (Test Method TM-7, Calgon Carbon Corporation, Pittsbugh, Pa.) of 0.455 grams per cc. After gasification, the material was cooled to ambient temperature under an inert atmosphere. The ability of this char to decompose and remove peroxide was determined by the method given in Example 1. The t-¾ time shown by this material was 10.2 minutes.

EXAMPLE 3

Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 1 hour, and finally heated from 325° C. to 450° C. at a rate of 125° C. per hour. The resultant oxidized material was cooled to near ambient temperatures in a low oxygen content atmosphere. A portion of the oxidized, low-temperature char was rapidly heated to 950° C. under an inert gas atmosphere and maintained at that temperature for 1 hour. Immediately following this calcination treatment the material was contacted with steam, while maintaining a 950° C. temperature, for a period of time sufficient to achieve an Apparent Density (Test Method TM-7, Calgon Carbon Corporation, Pittsbugh, Pa.) of 0.448 grams per cc. After gasification, the material was cooled to ambient temperature under an inert atmosphere. The ability of this char to decompose and remove peroxide was determined by the method given in Example 1. The t-¾ time shown by this material was 18.2 minutes.

EXAMPLE 4

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4.5 hours, and finally heated from 325° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated, low-temperature char was rapidly heated to 900° C. under an inert gas atmosphere and maintained at that temperature for 1 hour. Immediately following this calcination treatment portions of the resultant material were activated with steam for various time periods. After activation, the materials were cooled to ambient temperature under an inert atmosphere. Three of the activated carbons so produced, when sized to less than 6 mesh and greater than 16 mesh (U.S. Standard Series Sieves) exhibited Apparent Densities (Test Method TM-7, Calgon Carbon Corporation, Pittsburgh, Pa.) of 0.589, 0.558, and 0.525 grams per cc, respectively. The abilities of these chars to decompose and remove peroxide were then determined by the method given in Example 1. The t-¾ times shown by these materials were 5.1 minutes for the carbon exhibiting the 0.589 g/cc Apparent Density, 3.8 minutes for the carbon exhibiting the 0.558 g/cc Apparent Density, and 3.1 minutes for the carbon exhibiting the 0.524 g/cc Apparent Density.

EXAMPLE 5

Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 5 hours, and finally heated from 325° C. to 450° C. at a rate of 125° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was activated with steam. After activation, the material was cooled to ambient temperature under an inert atmosphere. The activated carbon so produced, when sized to less than 4 mesh and greater than 6 mesh (U.S. Standard Series Sieves) exhibited an Apparent Density (Test Method TM-7, Calgon Carbon Corporation, Pittsbugh, Pa.) of 0.519 grams per cc. The ability of this char to decompose and remove peroxide was determined by the method given in Example 1. The t-¾ time shown by this material was 4.5 minutes.

EXAMPLE 6

Bituminous coal as used in Example 5 was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 5 hours, and finally heated from 350° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was activated with steam. After activation, the material was cooled to ambient temperature under an inert atmosphere. The activated carbon so produced, when sized to less than 4 mesh and greater than 6 mesh (U.S. Standard Series Sieves) exhibited an Apparent Density (Test Method TM-7, Calgon Carbon Corporation, Pittsbugh, Pa.) of 0.495 grams per cc. The ability of this char to decompose and remove peroxide was determined by the method given in Example 1. The t-¾ time shown by this material was 4.1 minutes.

EXAMPLE 7

Bituminous coal as used in Example 5 was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4 hours, and finally heated from 350° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was activated with steam. After activation, the material was cooled to ambient temperature under an inert gas atmosphere. The activated carbon so produced, when sized to less than 4 mesh and greater than 6 mesh (U.S. Standard Series Sieves) exhibited an Apparent Density (Test Method TM-7, Calgon Carbon Corporation, Pittsburgh, Pa.) of 0.571 grams per cc. The ability of this char to decompose and remove peroxide was determined by the method given in Example 1. The t-¾ time shown by this material was 6.1 minutes.

EXAMPLE 8

A bituminous coal was pulverized with about 6% coal tar pitch. This pulverized material was then intimately blended with 10% powdered corn starch. After blending, 20% water was added to the resultant mixture. This wet mix was then extruded using a ring-die pelletizer to produce pellets of approximately 4 mm diameter. The resultant pellets were then dried and screened to remove fines. In the presence of large quantities of excess air, these pellets were oxidized by heating from 100° C. to 200° C. at a rate of 200° C. per hour, then from 200° C. to 350° C. at a rate of 100° C. per hour, then held at 350° C. for 4.5 hours, and finally heated from 350° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated, low-temperature char was rapidly heated to 900° C. under an inert gas atmosphere and maintained at that temperature for 1 hour. Immediately following this calcination treatment the material was activated with steam. After activation, the material was cooled to ambient temperature under an inert gas atmosphere. The activated carbon pellets so produced were approximately 4 mm in diameter and exhibited an Apparent Density (Test Method TM-7, Calgon Carbon Corporation, Pittsburgh, Pa.) of 0.420 grams per cc. The ability of this char to decompose and remove peroxide was determined by the method given in Example 1. The t-¾ time shown by this material was 3.7 minutes.

EXAMPLE 9

Bituminous coal as used in Example 5 was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4 hours, and finally heated from 350° C. to 450° C. at a rate of 100° C. per hour. The resultant oxidized material was cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated, low-temperature char was rapidly heated to 950° C. under an inert gas atmosphere and maintained at that temperature for 1 hour. Immediately following this calcination treatment the material was activated with steam for approximately 15 minutes. After activation, the material was cooled to ambient temperature under an inert gas atmosphere. This slightly activated carbon was then heated to 425° C. and maintained at this temperature for 90 minutes in the presence of air. The carbon that resulted from this treatment was then cooled to near ambient temperatures in a low oxygen content atmosphere and subsequently impregnated with an aqueous urea solution and dried. The quantity of urea solution used was sufficient to produce a 4% urea loading on a dry weight basis. After impregnation, a portion of the impregnated, mildly activated carbon was rapidly heated to 950° C. under an inert gas atmosphere and maintained at that temperature for 1 hour. Immediately following this calcination treatment, the resultant material was activated with steam. Following this activation, the material was cooled to ambient temperature under an inert gas atmosphere. The activated carbon so produced, when sized to less than 4 mesh and greater than 6 mesh (U.S. Standard Series Sieves) exhibited an Apparent Density (Test Method TM-7, Calgon Carbon Corporation, Pittsbugh, Pa.) of 0.575 grams per cc. The ability of this char to decompose and remove peroxide was determined by the method given in Example 1. The t-¾ time shown by this material was 3.9 minutes.

While presently preferred embodiments of the invention have been described in particularity, they may be otherwise embodied within the scope of the appended claims.

What is claimed:

1. A process for the decomposition and removal of peroxides from gaseous or liquid media which comprises contacting said media with a carbonaceous char, said char being prepared by (a) carbonizing a bituminous coal or a coal having bituminous properties at temperatures below 700° C. in the presence of an oxidant gas; (b) oxidizing said bituminous coal or coal having bituminous properties at temperatures below 700° C. during or after said carbonization; and (c) contacting said carbonized and oxidized bituminous coal or coal having bituminous properties with a nitrogen-containing compound and during said contacting increasing the temperature to above 700° C.

2. A process as set forth in claim 1 wherein the said carbonaceous char has been activated at temperatures above 700° C. using at least one of $H_2O$, $CO_2$, and $O_2$.

3. A process as set forth in claim 1 wherein the said nitrogen-containing compounds are ammonia, urea, melamine or derivatives thereof.

* * * * *